United States Patent [19]
Cedergreen et al.

[11] Patent Number: 4,965,958
[45] Date of Patent: Oct. 30, 1990

[54] FISH HOLDER

[75] Inventors: Steven D. Cedergreen, Seattle; Ray Aspiri, Vashon; Kim R. Hunter, Kent; Butkui Chiu, Seattle, all of Wash.

[73] Assignee: Tempress, Inc., Seattle, Wash.

[21] Appl. No.: 373,875

[22] Filed: Jun. 29, 1989

[51] Int. Cl.⁵ .............................................. B25B 7/02
[52] U.S. Cl. .......................................... 43/55; 81/417; 81/427.5; 17/66
[58] Field of Search .................... 43/4, 55, 53.5; 81/427.5, 415, 417, 418; 294/16, 104, 28; 17/66

[56] References Cited

U.S. PATENT DOCUMENTS

| | | |
|---|---|---|
| 465,222 | 12/1891 | Ulbricht . |
| 553,485 | 1/1896 | Earl . |
| 753,048 | 2/1904 | Des Moineaux .................. 81/427.5 |
| 1,219,857 | 3/1917 | Parkhurst ............................ 81/418 |
| 1,792,837 | 2/1931 | Harrison ............................ 43/53.5 |
| 2,155,913 | 4/1939 | Thompson et al. . |
| 2,358,682 | 9/1944 | Benton et al. . |
| 2,411,319 | 11/1946 | Duarte . |
| 2,506,227 | 5/1950 | Lindsey . |
| 2,570,538 | 10/1951 | Fincher et al. . |
| 2,583,476 | 1/1952 | Davidson . |
| 2,600,445 | 6/1952 | Sundstrand ........................ 81/415 |
| 2,759,758 | 8/1956 | Yancey . |
| 2,790,437 | 4/1957 | Moore . |
| 2,819,110 | 1/1958 | Redmon . |
| 3,001,320 | 9/1961 | Sonner, Jr. . |
| 3,219,376 | 11/1965 | Peters . |
| 3,287,845 | 11/1966 | Smith . |
| 3,667,798 | 6/1972 | Rusztowicz . |
| 3,669,487 | 6/1972 | Roberts et al. . |
| 3,844,599 | 10/1974 | Burian . |
| 3,930,329 | 1/1976 | Burkhardt .............................. 43/4 |
| 4,037,868 | 7/1977 | Baker . |
| 4,148,512 | 4/1979 | Pendlebury . |
| 4,289,109 | 9/1981 | D'Andrade ........................ 124/67 |
| 4,559,853 | 12/1985 | Oye . |
| 4,645,253 | 2/1987 | Hogden, Sr. et al. . |
| 4,662,667 | 5/1987 | Gilligan et al. . |

FOREIGN PATENT DOCUMENTS 510094  2/1955  Canada .

OTHER PUBLICATIONS

Product Catalog, p. 9 (bottom), Tempress Inc., published Jul. 1987.

*Primary Examiner*—Richard K. Seidel
*Assistant Examiner*—James Miner
*Attorney, Agent, or Firm*—Christensen, O'Connor, Johnson & Kindness

[57] ABSTRACT

A fish holder including a handle having a lower jaw extending transversely therefrom. A trigger is pivotally positioned inside of the handle and includes an upper jaw that extends transversely to the trigger and overlies the lower jaw arm. A biasing spring internally engages the trigger and the handle to maintain the jaw in an open position. When the handle and the trigger are grasped by a hand and squeezed, the jaw will close.

6 Claims, 4 Drawing Sheets

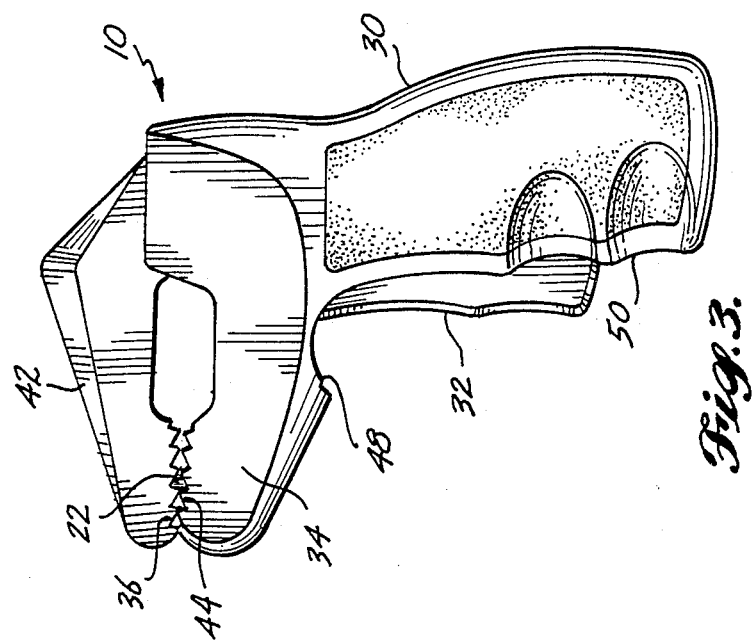
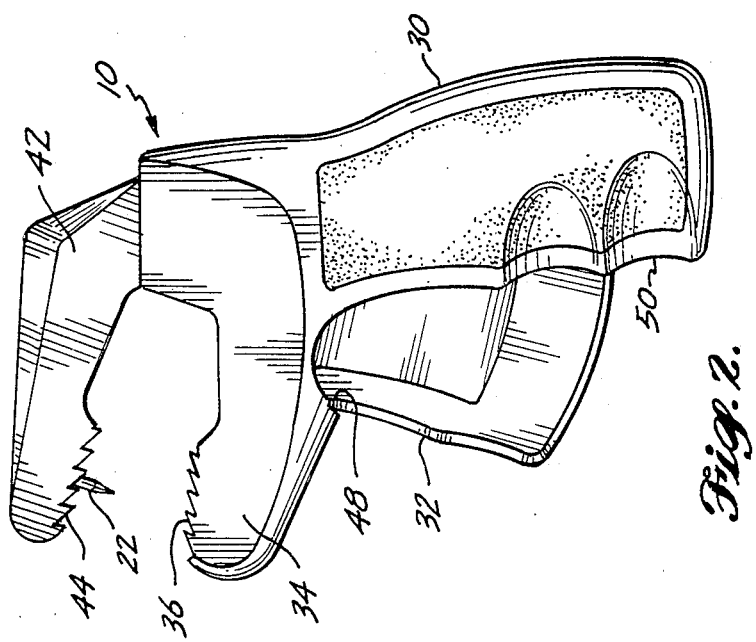

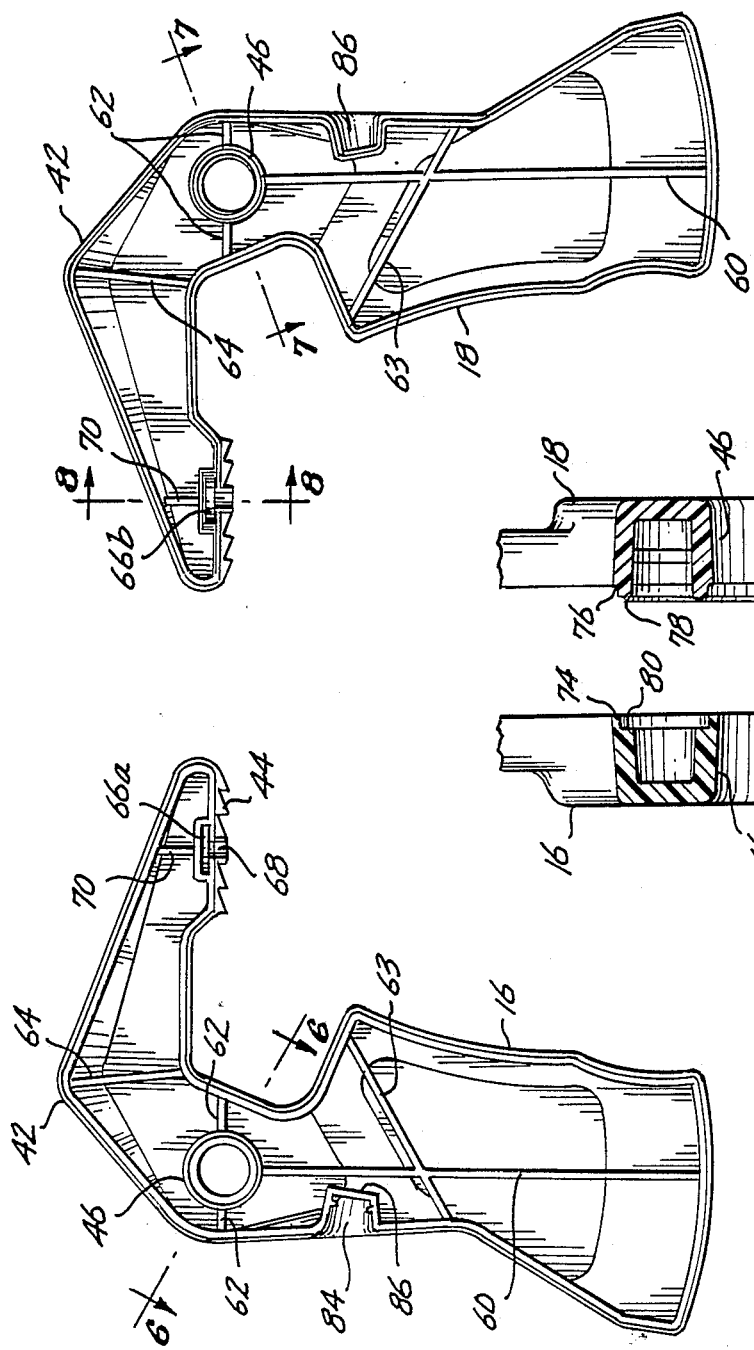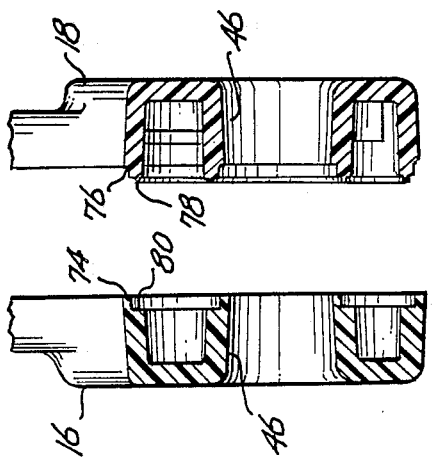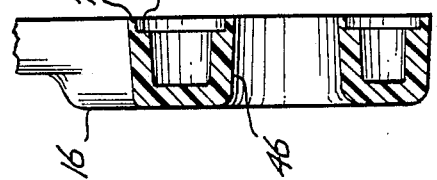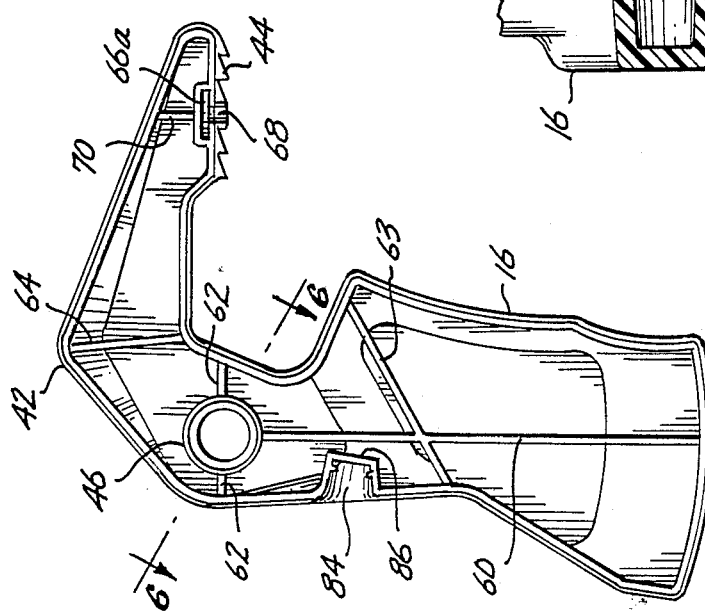

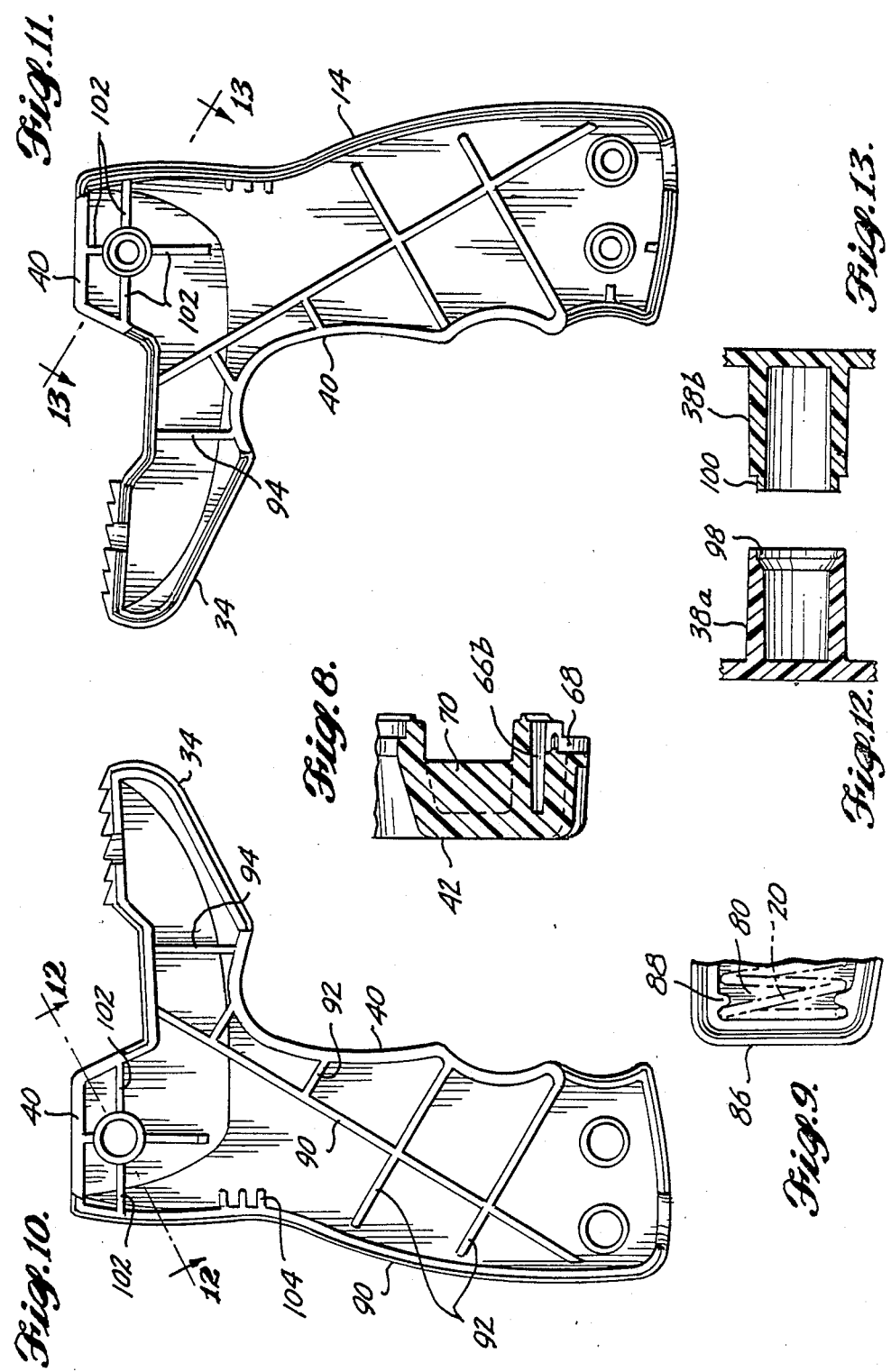

FISH HOLDER

TECHNICAL AREA

The present invention relates to a device for holding live fish, and more particularly, to a simple, sturdy, handheld device that clamps on the lower jaw of a fish.

BACKGROUND OF THE INVENTION

Many different devices have been constructed for the purpose of holding a live fish after it has been reeled in by a fisherman for the purpose of immobilizing the fish and for the purpose of removing a hook from the fish's mouth. Most of the present devices are overly complex, expensive, and many times difficult to use. Because of this, many fishermen have adapted ordinary tools for their use. For example, some fishermen will use an ordinary pliers to grasp a a fish by its mouth. However, ordinary tools also have their drawbacks in that they require awkward hand positions, with many larger fish do not have adequate jaw reach, and are subject to corrosion and rusting, especially when used in a salt water environment.

SUMMARY OF THE INVENTION

The present invention provides a lightweight, durable, simple, molded plastic device for grasping a fish by its mouth. The device can easily be grasped in one hand and manipulated to hold fish of a variety of sizes. The device comprises a handle adapted for grasping by a human hand. The handle has a lower jaw arm extending transversely from the upper portion of the handle. The lower jaw arm has an upward facing jaw face. The handle is hollow and has a vertical opening extending downwardly along the front side from the lower jaw arm to a location adjacent but spaced from the lower end of the handle. The lower jaw arm has an upwardly oriented opening at its rearward end. A trigger is mounted for pivotal movement inside the handle. The trigger is pivoted generally at the intersection of the handle and the lower jaw arm. The trigger has a front edge extending out of the vertical opening of the handle. The front edge is sufficiently long so that it can be grasped by three fingers of a human hand. The little finger of the human hand is positionable below the front edge of the trigger to grasp the lower portion of the handle. The trigger extends upwardly through the upward opening from within the handle and terminates in a forwardly extending upper jaw arm overlying the lower jaw arm. The upper jaw arm has an upper jaw face juxtaposed with and complementary to the lower jaw face. A stop means is associated with the trigger and the handle to limit the forward pivotal motion of the trigger. A means is also provided for biasing the trigger toward the stop means and thus the jaw toward an open position.

BRIEF DESCRIPTION OF THE DRAWINGS

A better understanding of the present invention can be derived by reading the ensuing specification in conjunction with the accompanying drawings, wherein:

FIG. 2 is a side elevation view of the device shown in the normal open position with the trigger biased forwardly and the jaw open;

FIG. 3 is a view similar to FIG. 2, except the trigger has been squeezed and the jaw is closed;

FIG. 4 is an inside elevation view of the left half of the handle and upper jaw;

FIG. 5 is an inside elevation view of the mirror image right-hand half of the trigger and upper jaw arm;

FIG. 6 is a sectional view taken along section line 6—6 of FIG. 4;

FIG. 7 is a sectional view taken along section line 7—7 of FIG. 5;

FIG. 8 is an enlarged sectional view taken along section line 8—8 of FIG. 5;

FIG. 9 is an enlarged view of the half of the spring retaining recess located in the right half of the handle;

FIG. 10 is an inside elevation view of the left hand of the trigger and lower jaw arm;

FIG. 11 is an inside elevation view of the mirror image right-hand half of the trigger and lower jaw arm;

FIG. 12 is a sectional view taken along section line 12—12 of FIG. 10; and

FIG. 13 is a sectional view taken along section line 13—13 of FIG. 11.

DESCRIPTION OF THE PREFERRED EMBODIMENT

Figure 1:
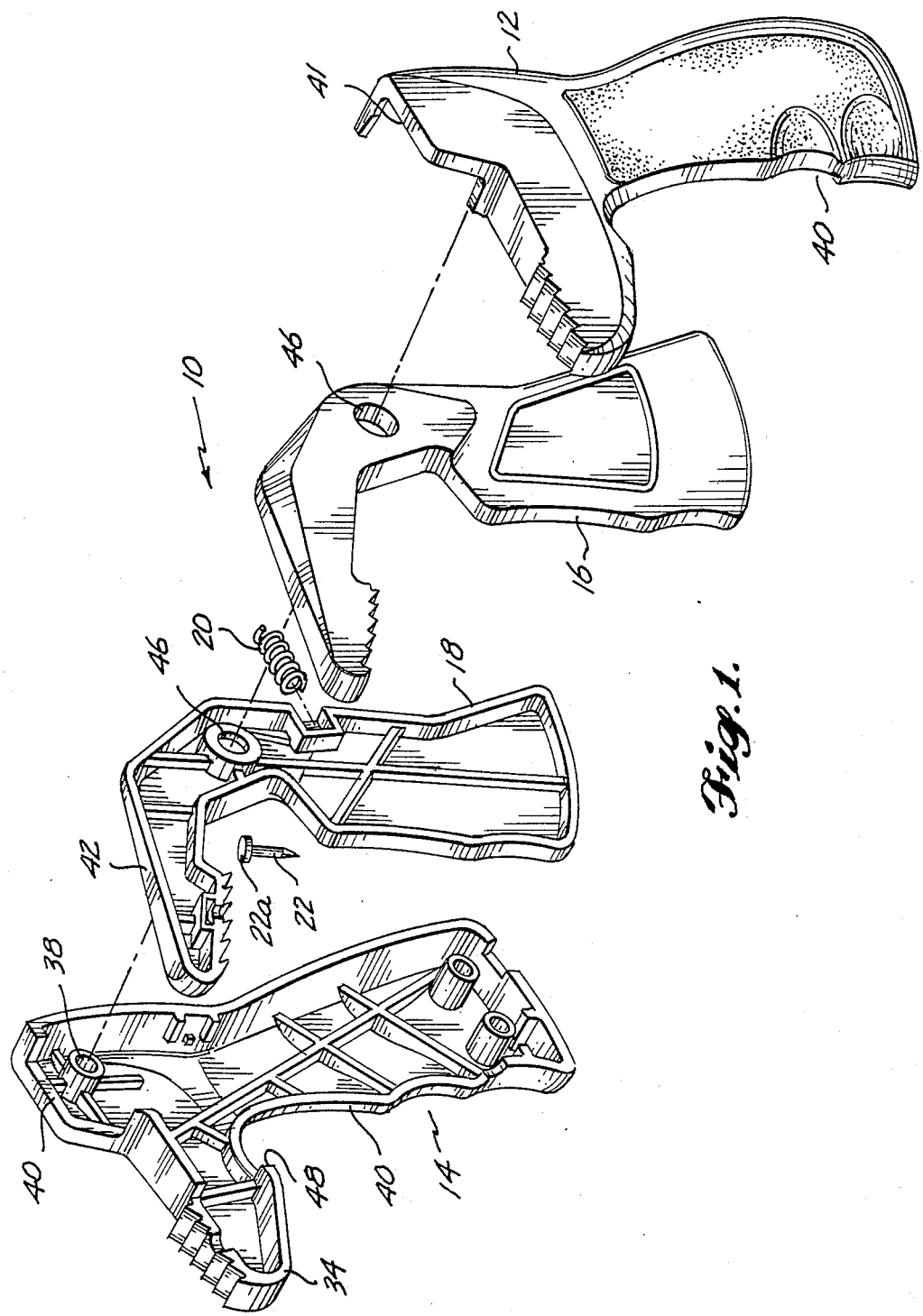
FIG. 1 is an exploded isometric view of the fish grasping device constructed in accordance with the present invention.

Referring first to FIG. 1, the fish holder generally designated 10 is composed of five basic components: left and right handle halves 12 and 14, respectively, left and right trigger halves 16 and 18, respectively, biasing spring 20 and retention pin 22. The left and right handle halves and left and right trigger halves are injection molded so that when placed in juxtaposed relationship, the interiors are hollow.

Referring conjunctively to FIGS. 1 and 2, the handle halves 12 and 14 are fitted to gether to form the handle, generally designated 30. The handle is designed so that its interior is hollow. The handle 30 is oriented in a generally upright direction and includes a lower jaw arm 34 that extends away from the handle 30 at close to but slightly greater than a right angle. The forward upper half of the lower jaw arm 34 carries a jaw face 36 that faces upwardly. A pivot shaft 38, described in more detail later, is molded into the upper handle halves 12 and 14 so that when the handles are fitted together a continuous pivot shaft is formed. The pivot shaft 38 is located at the juncture of the handle 30 and the lower jaw arm 34. The handle 30 also has an opening 40 that extends from the bottom half of the lower jaw arm 34 adjacent the handle downwardly along the front of the handle to a location adjacent but spaced from the lower end of the handle 30. A second opening 41 is located at the upper end of the handle and opens upwardly above the pivot shaft 38.

The trigger halves 16 and 18 are also molded so that when the halves are fitted together in juxtaposed relationship the trigger, generally designated 32, is formed. The trigger 32 which has a slimmer profile than the handle. An upper jaw arm 42 extends away from the upper end of the trigger at close to but slightly greater than a right angle. The forward end of the upper jaw arm 42 also carries a downwardly facing jaw face 44. A pivot bearing 46 is molded into trigger halves 16 and 18. When trigger halves 16 and 18 are joined, the pivot bearing 46 comprises a bore through the trigger generally at the location of the intersection of the trigger and the upper jaw arm 42. Before the handle halves 12 and 14 are joined, the trigger halves 16 and 18 are joined and positioned between the handle halves 12 and 14 so that the pivot bearing 46 is aligned with the pivot shaft 38. The handle and trigger are so positioned that the front edge of the trigger extends out of the opening 40, while the upper jaw arm extends upwardly and forwardly out of the opening 41. As will be explained in more detail later, the biasing spring 20 and pin 22 are also positioned in the handle before assembly. The handle halves 12 and 14 are then assembled to form the completed fish holder as shown in FIG. 2.

The biasing spring biases the trigger in a forward direction, as shown in FIG. 2, which maintains the upper and lower jaw arms apart, that is open, and the jaw faces 36 and 44 in mutually opposing relationship. The front edge 48 of the opening 40 serves as a stop against which the forward edge of the trigger abuts to limit the forward movement of the trigger by the biasing force of the spring. The device can be grasped by a person's right or left hand. The trigger 32 is positioned so that the first three fingers wrap around the trigger, while the little finger wraps around the lower portion 50 of the handle. Thus, substantial force can be exerted on the trigger with three fingers. When the three fingers squeeze the trigger, it is moved rearwardly against the bias of the spring, causing the upper jaw arm 42 to move downwardly and the jaw faces 36 and 44 to abut, as shown in FIG. 3.

Referring now to FIGS. 4 and 5, the left and right trigger halves 16 and 18 are generally mirror images of each other. The only parts of the trigger halves that are not identical are the outer abutting edges, which will be described in more detail below. Each of the trigger halves carries internal reinforcing ribs. A vertical rib 60 extends from the bottom edge of the trigger upwardly to the location of the pivot bearing 46. An orthogonal rib 62 extends sidewardly from the pivot bearing 46. A third transversely oriented rib 63 extends across the central portion of each of the handle halves. The upper portion of the upper jaw is pyramidal in shape when the trigger halves are joined together. A reinforcing rib 64 also extends from the apex of the pyramid downwardly to the lower edge of the upper jaw arm. The downwardly facing upper jaw face 44 is serrated in a direction transverse to the longitudinal extent of the upper jaw arm 42. A recess 66 is formed in the interior of the jaw arm above the central portion of the jaw face 44. A mirror image recess 66b is formed in the right trigger half and an aperture 68 extends downwardly from the recess 66 through the central portion of the jaw face. The pin 22 (shown only in FIG. 1) has a head 22a that fits in the recess 66. The pin extends downwardly through the aperture 68 to a location spaced below the upper jaw face 44. When the trigger halves are joined, the pin head and pin are captively secured in the recess 66. Referring in addition to FIG. 8, reinforcing ribs 70 extend upwardly from the upper wall of the recesses 66a and 66b and join the upper edges of the upper jaw arm 42.

Referring to FIGS. 6 and 7, the portions of the pivot bearing 46 located on each of the trigger halves are inwardly extending annular segments that are molded integrally with the side and edge walls of the trigger halves. The segments join at the center plane of the trigger halves. This view highlights the differences in the edge construction of the left and right trigger halves. For example, an outer shoulder 74 on the left trigger half 16 mates with a recess 76 on the abutting edge of the right trigger half 18. A shoulder 78 interior of the recess 76 mates with a complementary recess 80 interior of the shoulder 74. In this manner, a smooth outer surface is provided while also providing an interlocking structure and an extended adhesive surface to provide structural integrity to the two halves when joined. A similar shoulder structure is employed at the abutting surfaces of the pivot bearing 46. The abutting edges of the handle halves are similarly configured.

The rearward edge of the trigger halves 16 and 18 carry a recess 84 positioned slightly below the pivot bearing 46. The recess has an inner wall 86 against which one end of the biasing spring abuts. Referring to FIG. 9, an enlarged view of the portion of the recess 84 in the right-hand trigger half, a pair of transverse ridges 88 are positioned slightly outwardly from the inner wall 86 of the recess. These ridges engage the innermost coils of the spring 20 so as to retain the spring within the recess during the assembly procedure.

Referring now to FIGS. 10 and 11, the left and right handle halves, respectively, are generally mirror images of each other with the exception of the mating edges where complementary shoulder structures are formed as described in connection with the trigger halves. The handle halves carry a diagonal reinforcing ridge 90 and several reinforcing ridges 92 oriented orthogonally to the diagonal ridge in the region behind the opening 40. These reinforcing ridges rigidify the handle and compensate for the lack of edge contact in the region of the opening 40. A similar reinforcing ridge 94 extends from the upper central portion of the lower jaw arm to the forward portion of the opening 40 at the rear lower edge of the jaw arm 34.

Referring to the details of FIGS. 12 and 13, the pivot shaft 38 is composed of pivot shaft portions 38a and 38b extending inwardly from the wall of the left and right handle portions immediately below the opening 40 at the upper edge of the handle. Pivot shaft portions 38a and 38b are generally cylindrical in nature. The inner edges of the shaft portions 38a and 38b carry complementary shoulder 98 and groove 100 arrangements to prevent radial movement of the shaft portions once assembled. Referring back to FIGS. 10 and 11, reinforcing walls 102 radiate at four spaced locations from the exterior of the pivot shaft adjacent the outer walls of the handle halves.

Referring back to FIGS. 10 and 11, the rear edge of the handle halves carry positioning ridges opposite the recess 84 in the trigger that run transversely relative to the handle. These positioning ridges 104 serve to retain the free end of the biasing spring so as to prevent it from sliding upwardly or downwardly as the handle is squeezed, thus maintaining the orientation of the spring in the proper direction to exert maximum force on the trigger.

It will also be appreciated that the width of the opening 40 is just slightly greater than the width of the trigger 32. Thus, if lateral force is placed on the upper jaw, the size of the trigger immediately abuts the reinforcing ridges 90 and 92 so as to prevent any substantial lateral movement of the jaw. In this manner, even though a relatively strong or large fish is being grasped with the fish holder, the sturctural integrity of the holder will be retained.

The present invention has been described in conjunction with a preferred embodiment. One of ordinary skill will readily realize that many alterations, changes, and substitutions of equivalents can be made without departing from the broad concepts disclosed herein. It is therefore intended that the protection afforded by Letters Patent hereon be limited only by the definition contained in the appended claims and equivalents thereof.

The embodiments of the invention in which an exclusive property or privilege is claimed are defined as follows:

1. A device for grasping a fish comprising:

a handle adapted for grasping by a human hand, said handle having a lower jaw arm extending transversely from the upper portion thereof, said lower jaw arm having an upward facing jaw face, said handle being hollow and having a vertical opening extending downwardly along the front side thereof from said lower jaw arm to a location adjacent but spaced from the lower end of said handle, said lower jaw arm having a upward opening at its rearward end, a trigger mounted for pivotal movement inside said handle, said trigger being pivoted generally at the intersection of said handle and said lower jaw arm, said trigger having a front edge extending out of the vertical opening of said handle, said front edge being sufficiently long to be grasped by three fingers of a human hand, the little finger of said hand being positioned below said front edge and grasping the lower portion of said handle, said trigger extending upwardly through said upward opening from within said handle and terminating in a forwardly extending upper jaw arm overlying said lower jaw arm and having an upper jaw face complimentary to said lower jaw face, stop means associated with said trigger and said handle to limit the forward pivotal motion of said trigger, and means for biasing said trigger toward said stop means.

2. The device of claim 1 further comprising:

a pin affixed to the upper jaw arm and extending downwardly from the central portion of said upper jaw face, said lower jaw having an aperture therin for receiving said pin as said jaws are closed.

3. The device of claim 2 wherein said upper jaw further comprises:

means defining a cavity positioned in interior of the central portion of said upper jaw face, said pin having a head, said head being positioned in and retained by said cavity, and a reinforcing wall extending from the upper wall of said cavity along the inner side wall of said upper jaw and engaging the upper wall of said uper jaw.

4. The device of claim 2 wherein said upper jaw further comprises:

a reinforcing ridge on the interior of said upper jaw adjacent its junction with said trigger, said reinforcing ridge extending from the lower wall of said jaw to the upper wall of said jaw.

5. The device of claim 1 wherein said biasing means comprises a compression spring positioned in retaining means formed on the interior rear wall of said handle and a recess in the exterior rear wall of said trigger.

6. The device of claim 5 wherein said recess includes retaining ridges on the sides thereof, said retaining ridges engaging a coil of said spring to retain said spring and said recess.

* * * * *

UNITED STATES PATENT AND TRADEMARK OFFICE
CERTIFICATE OF CORRECTION

PATENT NO. : 4,965,958

DATED : October 30, 1990

INVENTOR(S) : S. Cedergreen et al.

It is certified that error appears in the above-identified patent and that said Letters Patent is hereby corrected as shown below:

| Column | Line | |
|---|---|---|
| 2 | 35 | "to gether" should be --together-- |
| 4 | 61 | "sturctural" should be --structural |
| 6 | 8 | "therin" should be --therein-- |

Signed and Sealed this

Thirty-first Day of March, 1992

*Attest:*

HARRY F. MANBECK, JR.

*Attesting Officer*     *Commissioner of Patents and Trademarks*